US006777852B2

United States Patent
Ishikawa et al.

(10) Patent No.: US 6,777,852 B2
(45) Date of Patent: Aug. 17, 2004

(54) STATOR CORE OF TORQUE MOTOR

(75) Inventors: Katsuji Ishikawa, Obu (JP); Yukiya Kato, Obu (JP); Shinji Kamiya, Obu (JP)

(73) Assignee: Aisan Kogyo Kabushiki Kaisha, Aichi (JP)

( * ) Notice: Subject to any disclaimer, the term of this patent is extended or adjusted under 35 U.S.C. 154(b) by 0 days.

(21) Appl. No.: 10/642,164

(22) Filed: Aug. 18, 2003

(65) Prior Publication Data

US 2004/0041492 A1 Mar. 4, 2004

(30) Foreign Application Priority Data

Aug. 27, 2002 (JP) ........................................ 2002-247394

(51) Int. Cl.$^7$ ................................................. H02K 1/12
(52) U.S. Cl. ........................ 310/259; 310/216; 310/49 R
(58) Field of Search ................................ 310/216–218, 310/254, 258, 259, 49 R

(56) References Cited

U.S. PATENT DOCUMENTS

| | | | | |
|---|---|---|---|---|
| 418,853 A | * | 1/1890 | Storey | 310/254 |
| 507,690 A | * | 10/1893 | Riker | 310/259 |
| 2,719,944 A | * | 10/1955 | Brailsford | 318/254 |
| 3,989,967 A | * | 11/1976 | Kikuyama et al. | 310/112 |
| 4,528,533 A | * | 7/1985 | Montagu | 335/230 |
| 4,675,566 A | * | 6/1987 | Nystuen et al. | 310/254 |
| 4,890,528 A | * | 1/1990 | Kamijima | 84/95.2 |
| 5,927,249 A | * | 7/1999 | Ackermann et al. | 123/399 |
| 6,181,041 B1 | * | 1/2001 | Nose | 310/164 |

FOREIGN PATENT DOCUMENTS

JP          10-178769 A1      6/1998

* cited by examiner

Primary Examiner—Dang Le
(74) Attorney, Agent, or Firm—Rader, Fishman & Grauer PLLC

(57) ABSTRACT

A stator core of the invention is structured such that the stator core is provided with an arm portion for pressure inserting a coil portion, and pole tooth portions arranged in a columnar space for inserting a rotor in an opposing manner. In the stator core, a stator core entire body having a front entire shape of the stator core and a pair of stator core divided bodies approximately divided into two pieces are connected in an overlapping manner. A pair of stator core divided bodies are arranged in both sided so as to be provided with a space portion therebetween and oppose the pole tooth portions to each other, and a portion in the vicinity of the space portion of the stator core entire body connects the stator core divided bodies in both sides as a connection portion and is integrally formed. In accordance with the stator core, it is possible to improve an assembling workability at a time of manufacturing without generating reduction of a generation torque.

7 Claims, 7 Drawing Sheets

US 6,777,852 B2

STATOR CORE OF TORQUE MOTOR

BACKGROUND OF THE INVENTION

1. Field of the Invention

The present invention relates to a stator core of a torque motor, and more particularly to a stator core of a torque motor which can improve an assembling workability of the stator core without reducing a generation torque.

2. Description of Related Art

In conventional, for example, as a throttle control apparatus for controlling so as to open and close a throttle valve of an internal combustion engine, there has been known an apparatus in which a torque motor is used in a rotation driving portion.

The torque motor used in this kind of apparatus is a motor which utilizes a torque generated within a limited range of rotation angle or in a restricted state. Accordingly, the motor is generally provided with a pair of two-divided stator cores, a coil iron core assembled so as to connect end portions of a pair of stator cores, and a coil wound around the coil iron core, and is structured such that a rotor provided with a permanent magnet in an outer peripheral portion is rotatably arranged between circular arc pole tooth portions arranged so as to oppose to each other in a pair of stator cores.

Further, in conventional, as this kind of torque motor, there has been proposed in Japanese Unexamined Patent Publication No. 10-178769 a torque motor having a structure in which coil winding portions of a pair of stator cores are joined together by coil iron cores, in order to simplify the assembling workability of the stator core.

However, in this torque motor, since the coil iron cores are connected to a pair of stator cores by engagement connection portions, a gap tends to be generated in the connection portion due to vibration or the like. When the gap is generated, there is generated a problem that a magnetic circuit of the stator cores is changed and a torque property of the motor becomes unstable.

Thus, in order to aim an improvement of the stability in the torque property and the assembling workability in the stator core, there has been considered a stator core having a structure in which both ends of the circular arc pole tooth portions of a pair of stator cores are integrally connected to each other. However, in the case that both ends of both side stator cores are integrally connected, the magnetic circuit formed between the pole tooth portions of the stator cores and the rotor is short circuited in the pole tooth portions. Accordingly, there has been generated a problem that the generation torque of the motor is reduced.

SUMMARY OF THE INVENTION

In order to achieve the object mentioned above, in accordance with the present invention, there is provided a stator core of a torque motor comprising:

arm portions for pressure inserting a coil portion; and pole tooth portions arranged in a columnar space for inserting a rotor in an opposing manner, wherein a stator core entire body having a front entire shape of the stator core and a pair of stator core divided bodies approximately divided into two pieces are connected in an overlapping manner, a pair of stator core divided bodies are arranged in both sided so as to be provided with a space portion therebetween and oppose the pole tooth portions to each other, and a portion in the vicinity of the space portion of the stator core entire body connects the stator core separation bodies in both sides as a connection portion and is integrally formed.

The object of the present invention is to provide a stator core of a torque motor which can improve an assembling workability at a time of manufacturing without generating reduction of the generation torque, on the basis of the structure mentioned above.

In accordance with the stator core of the torque motor on the basis of the present invention, the stator core entire body and the stator core divided bodies are connected in an overlapping manner, and the portion in the vicinity of the space portion of the stator core entire body connects the stator core separation bodies in both sides as the connection portion and is integrally formed. Therefore, when pressure inserting the coil portion into the arm portion, it is possible to assemble the coil portion within the arm portion by a simple work constituted only by pressure inserting the coil portion into the arm portion, in comparison with the conventional case that the coil iron core of the coil portion is fitted to the end portions of both side stator cores in the state in which a pair of two-divided stator cores are fixed to the predetermined positions.

Further, in the torque motor using the stator core, there is a possibility that the pole tooth portions of both side stator cores short circuit the magnetic circuit by the connection portion so as to reduce the generation torque, however, a thickness of the connection portion is restricted so that the reduction of the generation torque becomes minimum by adjusting a thickness of the stator core entire body or a number of lamination of the laminated metal sheets within a range having a bearing force at the pressure inserting time, whereby it is possible to stably generate a torque required as the torque motor. Further, in the torque motor using the stator core, since the coil iron core of the coil portion is pressure inserted, it is possible to reduce a risk that the gap is generated between the coil iron core and the stator core due to the vibration or the like, and it is possible to secure an improved torque property.

DESCRIPTION OF THE PREFERRED EMBODIMENTS

A description will be given below of the present invention on the basis of embodiments shown in the accompanying drawings. In this case, this invention is not limited to the embodiments. All the modifications within the contents of claims or equivalents to the contents are included in the range of claims.

Figure 1:
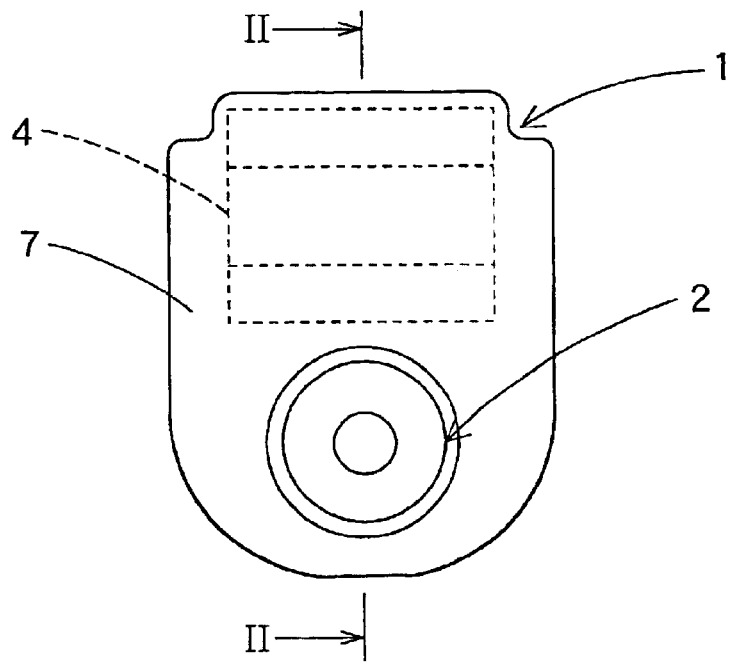
FIG. 1 is a front elevational view of a torque motor showing one embodiment in accordance with the present invention.
Figure 2:
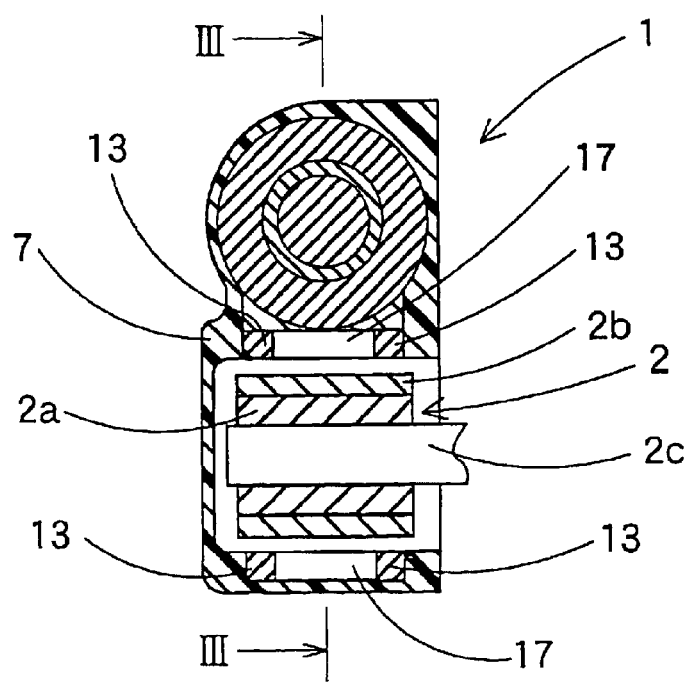
FIG. 2 is a cross sectional view along a line II—II in FIG. 1.
Figure 3:
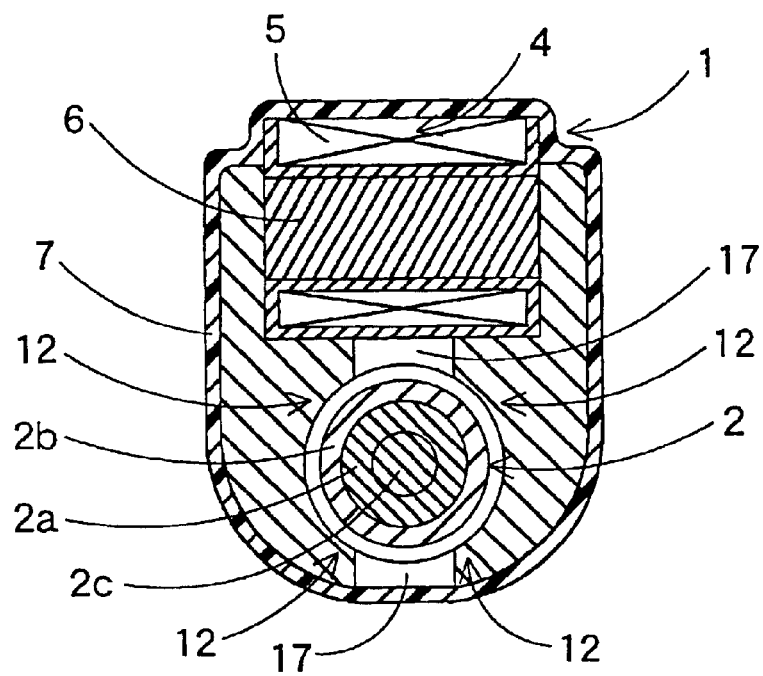
FIG. 3 is a cross sectional view along a line III—III in FIG. 2.

FIG. 1 shows a front elevational view of a torque motor, and FIGS. 2 and 3 show cross sectional views thereof. The torque motor is provided with a stator 1 and a rotor 2, an outer side of the stator 1 is covered with a resin housing 7, and the rotor 2 is rotatably arranged within a columnar space formed in a lower portion of the stator 1 via a slight gap.

Figure 4:
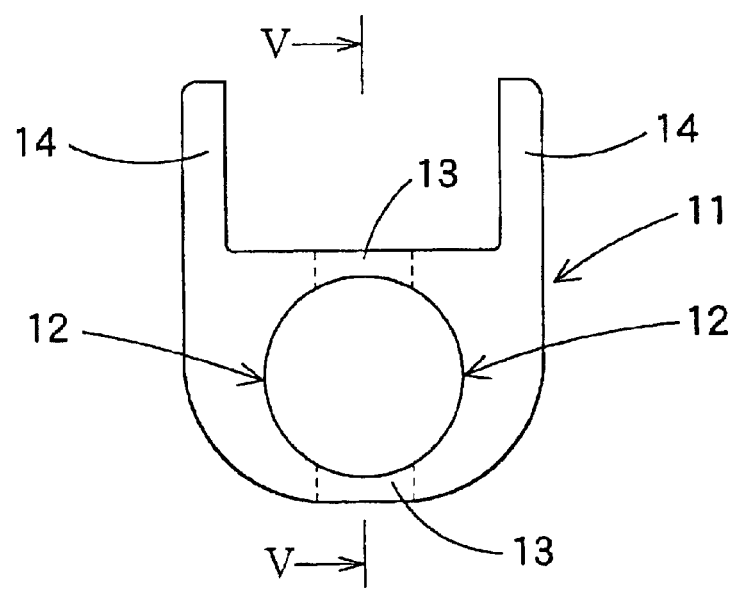
FIG. 4 is a front elevational view of a stator core.

As shown in FIGS. 4 to 7, a stator core 11 of the stator 1 is formed so as to have a front elevational shape as shown in FIG. 4. Arm portions 14 and 14 are formed in both upper sides of the stator core 11 so as to press insert a coil portion 4 therebetween, and are formed so as to annularly connect pole tooth portions 12 of the stator cores in both right and left sides by a center connection portion 13. In other words, the stator core 11 is formed by connecting the pole tooth portions 12 having a pair of circular arc portions arranged in both sides of the rotor 2 with a slight gap by the connection portion 13, and a space portion 17 is formed within the connection portion such that a magnetic circuit in the portion is narrowed so as to substantially shut off a magnetic flux passage. Thus, the stator core 11 is formed by laminating laminated steel sheets of three kinds of shapes.

Figure 7:
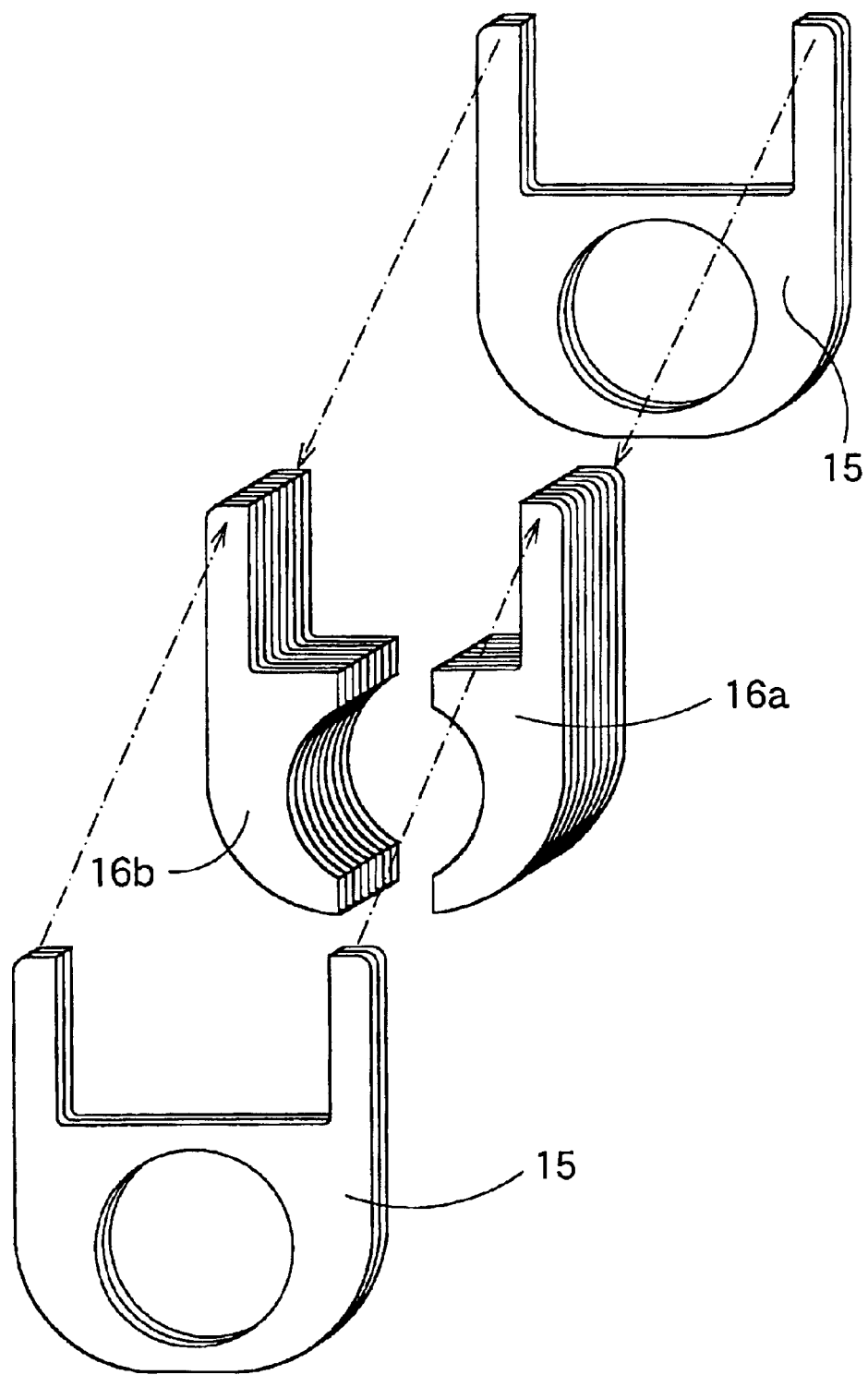
FIG. 7 is an exploded perspective view of the stator core.
Figure 8:
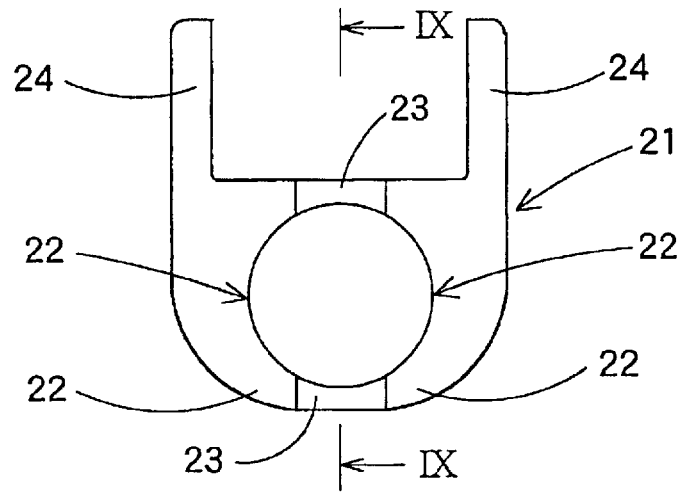
FIG. 8 is a front elevational view of a stator core in accordance with another embodiment.

In other words, as shown in FIG. 7, the stator core 11 is constituted by a stator core entire body 15 having the same shape of the front elevational shape of the stator core 11, and stator core divided bodies 16a and 16b which are formed so as to be approximately two divided pieces. The stator core 11 is formed by arranging the stator core divided bodies 16a and 16b in an inner side and laminating the stator core entire bodies 15 on a front face side (an upper face side) and a back face side (a lower face side). The stator core divided bodies 16a and 16b are arranged in both side positions so as to face to each other in a state in which the space portion 17 is formed between the stator core divided bodies 16a and 16b, and the stator cores 15 are fixed to the upper face and the lower face thereof in an overlapping manner.

Each of the stator core divided bodies 16a and 16b is formed by laminating, for example, eighteen laminated steel sheets each being cut (punched) in a predetermined shape, as shown in FIG. 7. The stator core divided bodies 16a and 16b are arranged in a state in which the pole tooth portions 12 are faced to each other with keeping the space portion 17 therebetween. Further, the stator core entire body 15 is formed by laminating, for example, two laminated steel sheets each being cut (punched) in a predetermined shape, as shown in FIG. 7. The stator core entire bodies 15 are assembled by laminating so as to be lapped over the upper faces and the lower faces of the stator core divided bodies 16a and 16b.

The assembly of the stator core 11, that is, the assembly of the stator core divided bodies 16a and 16b and the stator core entire bodies 15 can be achieved easily in accordance with a stacking which is obtained by forming small recess portions or small convex portions in a part of each of the laminated steel sheets at a time of cutting and caulking and fixing the recess portions or the convex portions while laminating the laminated steel sheets. Alternatively, it is possible to easily assemble and fix by welding edge portions of the stator core divided bodies 16a and 16b and the stator core entire bodies 15 in accordance with a laser welding in a state in which the respective laminated steel sheets of the stator core divided bodies 16a and 16b and the stator core entire bodies 15 are overlapped as shown in FIG. 7.

The arm portions 14 and 14 are formed, as shown in FIG. 4, in both upper sides of the stator core 11 assembled and formed as shown in FIG. 7, and the coil portion 4 in which a coil 5 having a predetermined winding number is wound around a coil iron core 6 is pressure inserted between the arm portions 14 and 14 as shown in FIG. 3. Since the pole tooth portions 12 having the circular arc portion and arranged in both sides so as to oppose to the columnar space in which the rotor 2 is positioned, is connected by the connection portion 13, and the stator core 11 is integrally formed, at a time of a pressure inserting step of the coil portion 4, the stator core 11 has a sufficient rigidity against the pressure insertion, and it is possible to easily pressure insert the coil portion 4 between the arm portions 14 and 14.

Figure 5:
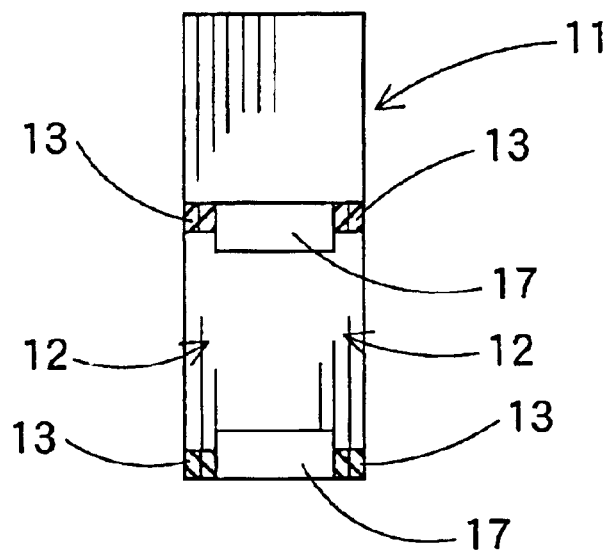
FIG. 5 is a cross sectional view along a line V—V in FIG. 4.
Figure 6:
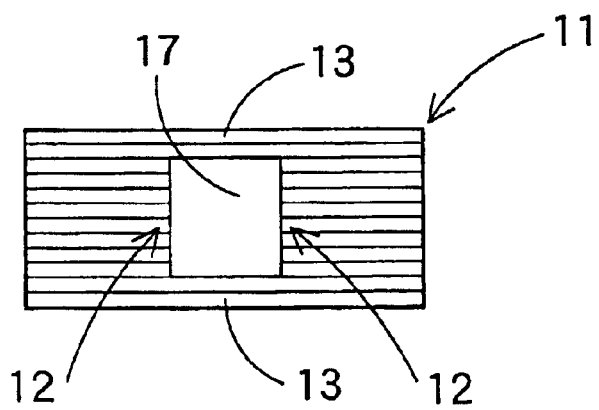
FIG. 6 is a bottom elevational view of the stator core.

In particular, since the connection portions 13 are formed in two positions of the stator core 11 in a thickness direction, as shown in FIGS. 5 and 6, and are formed in two positions in both upper and lower sides of the circular arc portion of the pole tooth portions 12 opposing to the rotor 2, a sufficient rigidity standing against the pressure insertion of the coil portion 4 can be achieved even in the case that the steel sheet of the connection portion 13 is thin. Further, the coil iron core 6 of the coil portion 4 pressure inserted to the stator core 11 having the rigidity mentioned above has a good connection state with the arm portion 14, and no gap is generated.

In the stator 1 to which the coil portion 4 is pressure inserted as mentioned above, the resin housing 7 is formed such that an entire of an outer peripheral surface of the stator 1 is covered with a synthetic resin except a columnar space for the rotor. When covering the resin housing 7, the resin housing 7 is formed by setting the stator 1 within a metal mold, and injecting the synthetic resin into the metal mold. In this case, since the stator core 11 of the stator 1 is integrally formed as mentioned above, and the space portion 17 and the columnar space for inserting the rotor 2 are formed in the stator core 11, it is possible to easily set the stator 1 within the metal mold by fitting a convex portion of the metal mold to the portion, and it is possible to easily form the resin housing 7.

The stator 1 to which the resin housing 7 is attached is mounted, for example, as a motor for controlling an operation of the throttle valve in the throttle control apparatus, within the apparatus, the rotor 2 is inserted into the columnar space of the stator 1 as shown in FIGS. 2 and 3, and a rotation axis 2c of the rotor 2 is connected, for example, to a throttle axis. The rotor 2 is structured such that a rotor core 2a of a cylindrical magnetic body is fixed to an outer peripheral portion of the rotation axis 2c, and a plurality of circular arc permanent magnets 2b are arranged in an outer peripheral portion of the rotor core 2a.

The torque motor is driven by applying an alternating current to the coil 5 of the coil portion 4. When the coil 5 is energized, a magnetic flux is generated in a magnetic circuit between the stator core 11 and the rotor 2 in correspondence to a direction in which the current flows. A suction force or a repulsive force is generated between the rotor 2 and the pole tooth portions 12 of the stator 1 on the basis of the generation of the magnetic field caused by the magnetic flux, whereby a torque for rotating the rotor 2 is generated.

At this time, in the stator core 11 of the torque motor, the pole tooth portions 12 in both sides opposing to the rotor 2 are connected by the connection portion 13, however, a number of the laminated steel sheets in the connection portion 13 is small, that is, equal to or less than about one fifth, and the space portion 17 is formed in an inner portion of the connection portion 13. Therefore, the magnetic flux is substantially shut off by the portion, and it is possible to prevent the magnetic circuit between the pole tooth portions 12 of the stator and the rotor 2 from being substantially short circuited by the connection portion 13. Accordingly, with regard to the torque of the motor, the same torque as the torque of the normal torque motor in which both side pole tooth portions are separated can be obtained, and it is possible to achieve a good performance for the torque motor.

In this case, in the embodiment mentioned above, each of the stator core entire bodies 15 arranged in both sides is formed by laminating two laminated steel sheets. It is preferable to form the connection portion 13 of the stator core entire body 15 as thin as possible within the rigidity required for pressure inserting the coil portion, in order to short circuit the magnetic circuit and obtain a good torque property. In correspondence to the thickness of the steel sheet, for example, each of the stator core entire body 15 may be formed by only one steel sheet.

FIGS. 8 to 11 show a stator core 21 in accordance with the other embodiment. The stator core 21 in accordance with this embodiment has a structure in which stator core divided bodies 26a and 26b are laminated on an upper face and a lower face of a stator core entire body 25 in a reverse manner to that of the stator core 11 mentioned above.

Figure 9:
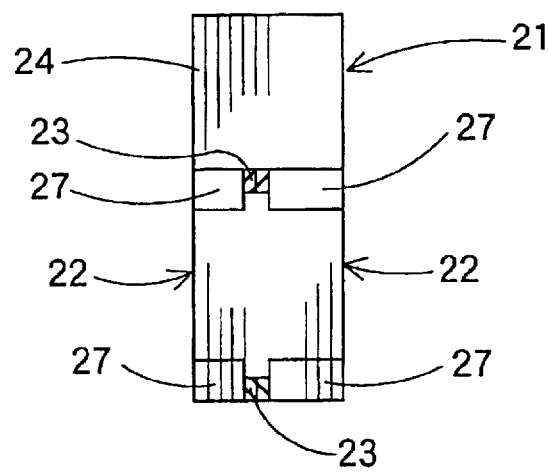
FIG. 9 is a cross sectional view along a line IX—IX in FIG. 8.
Figure 10:
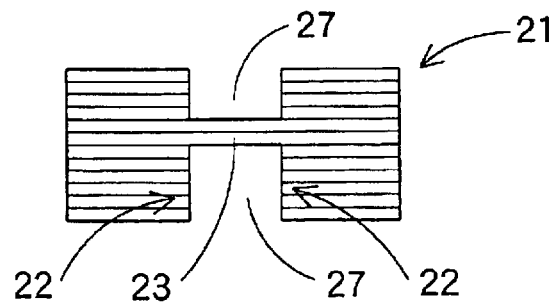
FIG. 10 is a bottom elevational view of the stator core.
Figure 11:
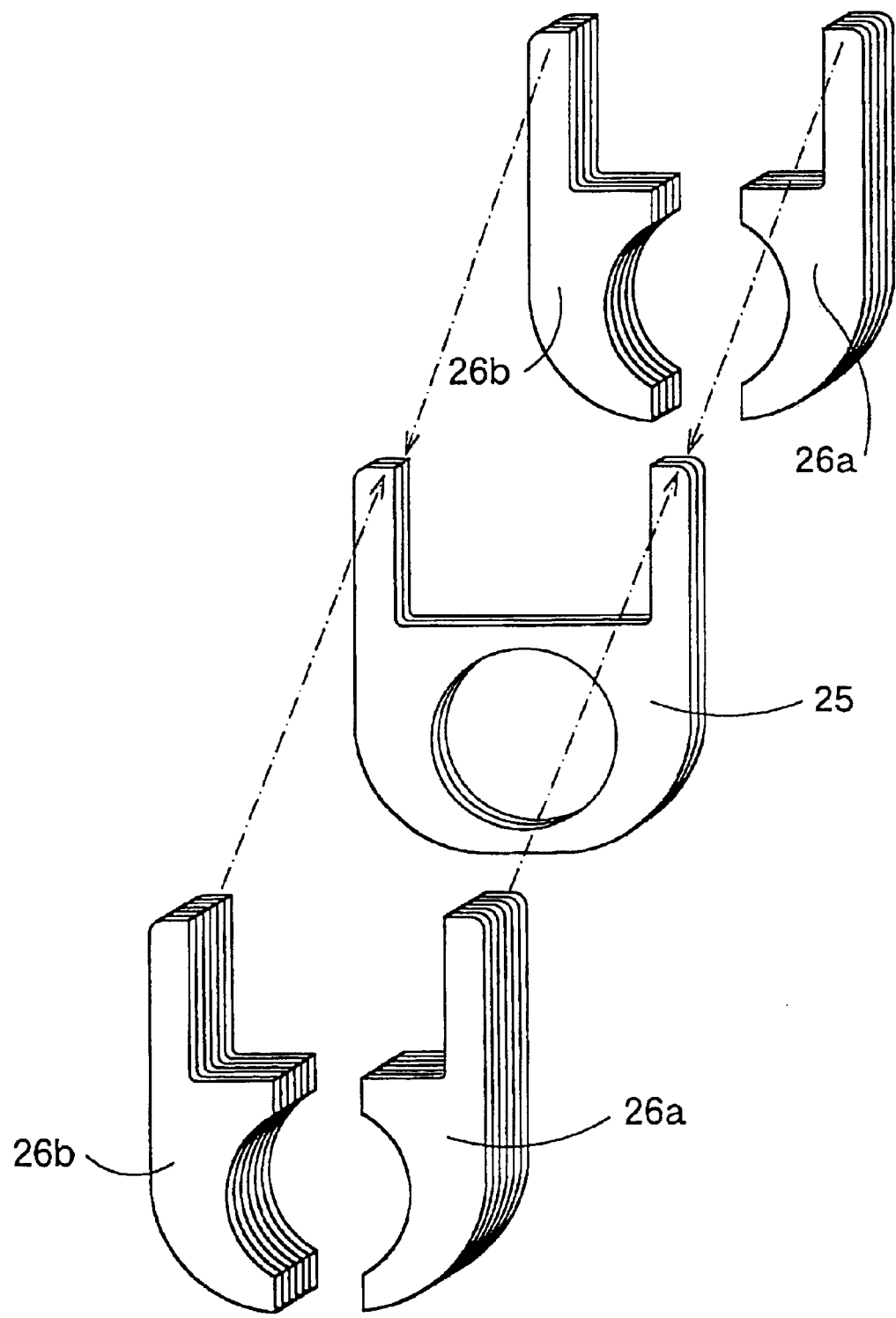
FIG. 11 is an exploded perspective view of the stator core.

In other words, the stator core 21 is constituted by a stator core entire body 25 having the same shape of the front elevational shape of the stator core 21, and stator core divided bodies 26a and 26b which are formed so as to be approximately two divided pieces. The stator core 21 is formed by arranging the stator core divided bodies 26a and 26b in an outer side and laminating the stator core entire body 25 so as to be clamped between the stator core divided bodies 26a and 26b, as shown in FIGS. 9 and 10. The stator core divided bodies 26a and 26b are arranged in both side positions so as to face to each other in a state in which a space portion 27 is formed between the stator core divided bodies 26a and 26b, as shown in FIG. 11, and are fixed in an overlapping manner so as to clamp the stator core entire body 25 in the inner side from both sides.

Each of the stator core divided bodies 26a and 26b is formed by laminating, for example, nine laminated steel sheets each being cut in a predetermined shape. The stator core divided bodies 26a and 26b are arranged in a state in which pole tooth portions 22 each having a circular arc portion are faced to each other with keeping the space portion 27 therebetween. Further, the stator core entire body 25 is formed by laminating, for example, two laminated steel sheets each being cut in a predetermined shape. The stator core entire body 25 is assembled by laminating so as to be lapped over the upper face and the lower face of the stator core divided bodies 26a and 26b, as shown in FIG. 11.

The assembly of the stator core 21, that is, the assembly of the stator divided bodies 26a and 26b and the stator core entire body 25 can be achieved easily in accordance with a stacking which is obtained by forming small recess portions or small convex portions in a part of each of the laminated steel sheets at a time of cutting and caulking and fixing the recess portions or the convex portions while laminating the laminated steel sheets. Alternatively, it is possible to easily assemble and fix by welding edge portions of the stator core divided bodies 26a and 26b and the stator core entire body 25 in accordance with a laser welding in a state in which the respective laminated steel sheets of the stator core divided bodies 26a and 26b and the stator core entire body 25 are overlapped as shown in FIG. 11. Further, it is possible to easily change the connection portion 13 of the stator core 21 to an optional position in a thickness direction of the stator core 21.

A coil portion in which a coil having a predetermined winding number is wound around a coil iron core is pressure inserted between the arm portions 24 and 24 in both upper sides of the stator core 21 assembled and formed in the manner mentioned above, in the same manner as mentioned above. Since the pole tooth portions 22 having the circular arc portion and arranged in both sides so as to oppose to the columnar space in which the rotor is positioned, is connected by the connection portion 23, and the stator core 21 is integrally formed, at a time of a pressure inserting step of the coil portion, it is possible to easily pressure insert the coil portion between the arm portions 24 and 24. Further, the connection state between the coil iron core of the pressure inserted coil portion and the arm portion 24 is improved, and no gap is generated.

Further, in the same manner as mentioned above, in the stator to which the coil portion is pressure inserted as mentioned above, the resin housing is formed such that an entire of an outer peripheral surface of the stator is covered with the synthetic resin except the columnar space for the rotor, and the rotor is rotatably arranged within the columnar space of the stator, thereby being used as the torque motor. In the same manner as mentioned above, in the stator core 21 of the torque motor, the pole tooth portions 22 in both sides opposing to the rotor and having the circular arc portion are connected by the connection portion 23, however, the number of the laminated steel sheets in the connection portion 23 is small, that is, equal to or less than about one fifth, and the space portion 27 is formed in upper and lower sides of the connection portion 23. Therefore, the magnetic flux is substantially shut off by the portion, and it is possible to prevent the magnetic circuit between the pole tooth portions 22 of the stator and the rotor from being substantially short circuited by the connection portion 23. Accordingly, with regard to the torque of the motor, the same torque as the torque of the normal torque motor structured such that both side pole tooth portions 22 are separated can be obtained, and it is possible to achieve a sufficient performance for the torque motor.

In this case, in the embodiment mentioned above, the stator core entire body 25 is formed by laminating two laminated steel sheets. Since the connection portion 23 of the stator core entire body 25 short circuits the magnetic circuit, it is possible to make the connection portion 23 as thin as possible within the rigidity required for pressure inserting the coil portion, in order to obtain a good torque property. In correspondence to the thickness of the steel sheet, for example, the stator core entire body 25 may be formed by only one steel sheet.

Figure 12:
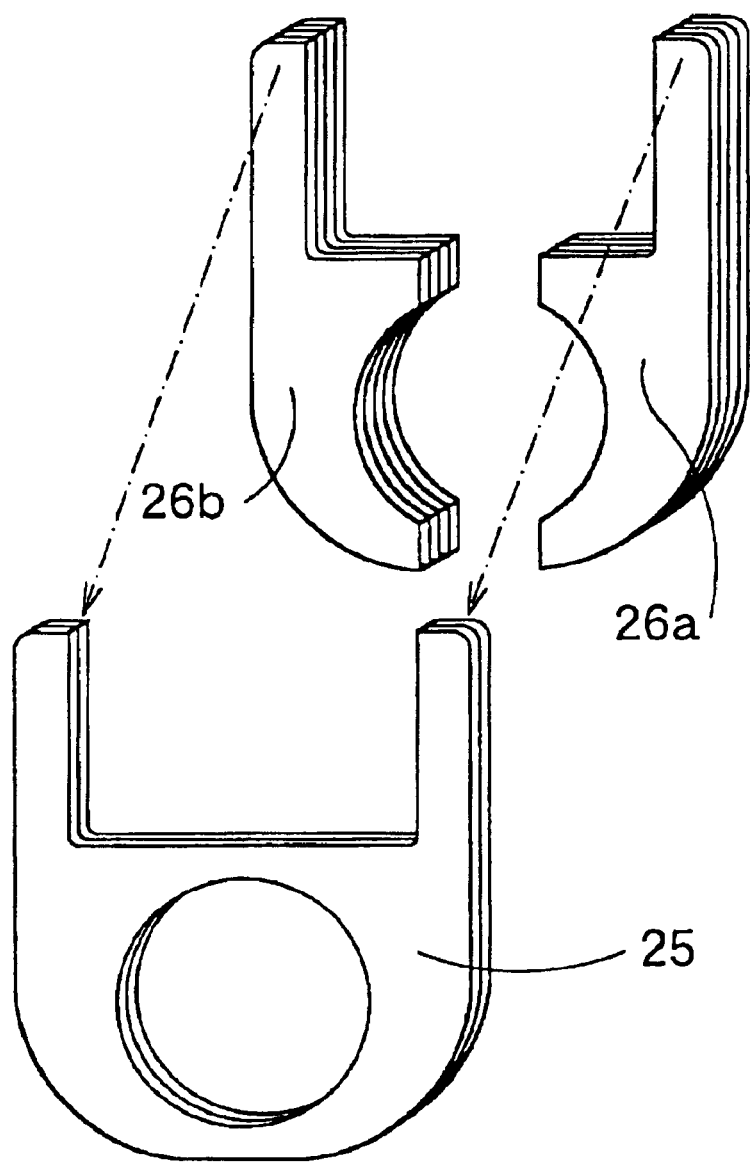
FIG. 12 is an exploded perspective view of a stator core in accordance with the other embodiment.

Further, as shown in FIG. 12, the structure may be made such that the stator core divided bodies 26a and 26b are lapped over and connected to only the upper face or the lower face of the stator core entire body 25.

As described above, in accordance with the stator core of the torque motor on the basis of the present invention, when pressure inserting the coil portion into the arm portion, it is possible to assemble the coil portion within the arm portion by a simple work constituted only by pressure inserting the coil portion into the arm portion, in comparison with the conventional case that the coil iron core is fitted to the end portions of both side stator cores in the state in which a pair of two-divided stator cores are fixed to the predetermined positions.

Further, with respect to the thickness of the connection portion, it is possible to restrict the reduction of the generated torque minimum by adjusting the thickness of the stator core entire body or the number of the laminated metal sheets within the range having the bearing force for the pressure insertion, and it is possible to stably generate the torque required as the torque motor.

Further, in the torque motor using the stator core, since the coil iron core of the coil portion is pressure inserted, it is possible to reduce a risk that the gap is generated between the coil iron core and the stator core due to the vibration or the like, and it is possible to secure an improved torque property.

Further, in accordance with the stator core structured such that a pair of stator core divided bodies having the pole tooth portions arranged in an opposing manner and having the space portion formed therebetween are connected to the upper face and the lower face of the stator core entire body in an overlapping manner, it is possible to optionally set the position in the height direction of the stator core in the connection portion. Accordingly, the position and the shape of the space portion can be easily changed, it is possible to easily mold the housing by resin, and it is possible to improve an assembling workability of the torque motor.

Further, in accordance with the stator core structured such that a pair of stator core divided bodies having the pole tooth portions arranged in an opposing manner and having the space portion formed therebetween are connected to the upper face or the lower face of the stator core entire body in an overlapping manner, it is possible to increase the flat portion of the torque property, and it is possible to obtain a more stable torque.

Further, in accordance with the stator core structured such that both side pole tooth portions arranged so as to oppose to each other are formed to have the circular arc portion, and the connection portions are formed in two positions adjacent to both sides of the circular arc portion, the rigidity of the arm portion to which the coil portion iron core is pressure inserted is improved, whereby it is possible to make the connection portion thin, and it is possible to restrict the reduction of the generated torque.

Further, in accordance with the stator core structured such that the stator core entire body and the stator core divided bodies are formed by laminating the laminated metal sheets which are cut in the respective shapes, and the lamination numbers of the stator core entire body and the stator core divided body are adjusted in correspondence to the bearing force at a time of pressure inserting the coil portion to the arm portion and the torque property of the motor, it is possible to easily change the shape and the size of the stator core, and it is possible to easily change the torque property.

What is claimed is:

1. A stator core of a torque motor comprising:
   a plurality of stator core divided bodies fabricated from a sheet metal material, each stator core divided body including an arm portion for pressure inserting a coil portion and a pole tooth portion forming an arc-shaped surface and arranged in a columnar space for inserting a rotor in an opposing manner,
   wherein a stator core entire body having a front entire shape of the stator core, being fabricated from a sheet metal material and a pair of the stator core divided bodies divided as two individual pieces are connected in a facially-opposing overlapping manner, said pair of stator core divided bodies are arranged in both sides so as to be provided with a space portion therebetween and oppose the pole tooth portions to each other such that the arc-shaped surfaces of each respective pair of stator core divided bodies facially-oppose each other, and a portion in the vicinity of said space portion of said stator core entire body connects said stator core divided bodies in both sides as a connection portion and is integrally formed.

2. A stator core of a torque motor as claimed in claim 1, wherein said pole tooth portions are arranged so as to be opposed to each other, and said stator core entire body is lapped over an upper face and a lower face of said pair of stator core divided bodies having said space portion formed therebetween.

3. A stator core of a torque motor as claimed in claim 1, wherein said pair of stator core divided bodies in which said pole tooth portions are arranged so as to be oppose to each other and said space portion is formed therebetween are connected in an overlapping manner to an upper face and a lower face of said stator core entire body.

4. A stator core of a torque motor as claimed in claim 1, wherein said pair of stator core divided bodies in which said pole tooth portions are arranged so as to be oppose to each other and said space portion is formed therebetween are connected in an overlapping manner to an upper face or a lower face of said stator core entire body.

5. A stator core of a torque motor as claimed in claim 1, wherein said pole tooth portions in both sides arranged in an opposing manner are formed so as to have a circular arc portion, and connection portions are formed in two positions adjacent to both sides of said circular arc portion.

6. A stator core of a torque motor as claimed in claim 1, wherein said stator core entire body and said stator core divided bodies are formed by laminating laminated metal sheets cut in respective shapes, and laminating numbers of said stator core entire body and said stator core divided body are adjusted in correspondence to a bearing force at a time of pressure inserting said coil portion to said arm portion and a torque property of the motor.

7. A stator core of a torque motor having a coil and a rotor, the stator core comprising:
   at least one stator core entire body fabricated from a sheet metal material and having a main body section formed with a rotor-receiving hole extending therethrough and sized to slidably receive the rotor and a pair of arm portions integrally formed with and extending from the main body section in a parallel manner relative to each other forming a generally U-shaped channel sized to receive the coil; and
   a plurality of identical pairs of stator core divided bodies fabricated from a sheet metal material, each one of the stator core divided bodies including a single arm portion and a pole tooth portion integrally connected to the single arm portion and defining an arc-shaped surface,
   wherein each identical pair of stator core divided bodies is arranged in a manner such that respective ones of the arc-shaped surfaces facially oppose each other in a space-apart relationship and the plurality of identical pairs of stator core divided bodies are laminated to one another and to the at least one stator core entire body in an overlapping manner such that the arc-shaped surfaces coincide with the rotor-receiving hole and respective ones of the single arm portions and the pairs of arm portions coincide with one another in an overlapping manner forming a coil-receiving chamber for receiving the coil therebetween.

* * * * *